United States Patent [19]

Parish et al.

[11] 4,153,184

[45] May 8, 1979

[54] MANUALLY OPERATED APPLICATOR HAVING A PLURALITY OF ROTORS FOR DISPENSING PARTICULATE MATERIAL

[75] Inventors: Richard L. Parish; James D. Amerine, both of Marysville, Ohio

[73] Assignee: The O. M. Scott & Sons Company, Marysville, Ohio

[21] Appl. No.: 851,207

[22] Filed: Nov. 14, 1977

[51] Int. Cl.² ............................................. G01F 11/10
[52] U.S. Cl. ................................... 222/185; 222/288; 222/305; 222/547
[58] Field of Search ............... 222/175, 185, 282, 283, 222/287–289, 305, 307, 308, 368, 369, 547, 564, 575, 294, 295, 303, 304

[56] References Cited

U.S. PATENT DOCUMENTS

| | | | |
|---|---|---|---|
| 241,307 | 5/1881 | Corwin | 222/308 X |
| 337,268 | 3/1886 | Keedy | 222/303 X |
| 557,987 | 4/1896 | Frank | 222/283 |
| 1,456,408 | 5/1923 | Scherer | 222/564 |
| 1,521,831 | 1/1925 | Olvawitsz | 222/175 |
| 1,982,094 | 11/1934 | Gessler | 222/564 X |
| 2,135,665 | 11/1938 | Hoban | 222/303 X |
| 2,348,205 | 5/1944 | Chater | 222/175 |
| 2,603,388 | 7/1952 | Bryant | 222/303 |
| 3,140,018 | 7/1964 | Miller | 222/307 X |

Primary Examiner—Robert J. Spar
Assistant Examiner—Fred A. Silverberg
Attorney, Agent, or Firm—James B. Raden; Harold J. Holt

[57] ABSTRACT

A manually operated applicator for distributing controlled quantities of particulate fertilizer or pesticide to container-grown ornamentals. The applicator comprises a hopper, an elongated discharge conduit extending below the hopper and a control located in the upper part of the discharge conduit for precise control of the quantity of particulate material distributed from the applicator. The control comprises one or more rotors horizontally mounted for rotation within a cylindrical housing, the rotors containing cavities therein for metering the amount of particulate material. The rotor is spaced from the housing to form an annular clearance to permit a small but controlled quantity of particulate material to enter the clearance. The rotor is mounted on a shaft journaled on bearings at both ends, one of the bearings being axially adjustable to accommodate varying numbers of rotors or rotors of varying axial thickness. The rotors are manually cranked by a suitable arm attached to the shaft.

8 Claims, 7 Drawing Figures

MANUALLY OPERATED APPLICATOR HAVING A PLURALITY OF ROTORS FOR DISPENSING PARTICULATE MATERIAL

This invention relates to an applicator for distributing controlled quantities of particulate material and more specifically an applicator of the type used to distribute fertilizer or pesticide in particulate form, to container-grown vegetation.

There is considerable need for a manually operated device for distributing fertilizers or pesticides to container-grown vegetation. Many devices of this type are known but they are frequently awkward to use, relatively expensive to produce, or unreliable.

It is a primary object of the present invention to provide a manually operated applicator for distributing particulate material to container-grown nursery stock which combines a high degree of accuracy and reliability with relatively low cost.

It is an additional object of this invention to provide such an applicator which is resistant to the build-up of particulate material and which may be easily and conveniently adjusted for different application rates.

The foregoing and other objects are achieved in an applicator comprising a hopper having an opening at a lower extremity thereof, an alongated discharge conduit extending below the hopper from said opening and control means located in the upper portion of the discharge conduit for controlling the amount of particulate material discharged from the applicator. The control means comprises one or more rotors horizontally mounted for rotation within a cylindrical housing, the housing having openings in communication with the hopper and the discharge conduit to permit particulate material to flow from the hopper through the rotor to the discharge conduit. The rotor contains cavities for metering the amount of particulate material flowing through the rotor. The rotor is spaced from the housing by a small annular clearance to permit a small but controlled amount of particulate material to enter the clearance. The rotor is fixedly mounted on a shaft journaled at both ends thereof on bearings mounted within said cylindrical housing. At least one of the bearings is axially adjustable to accommodate one or more rotors, or rotors of varying axial thickness. An arm is mounted on the shaft for manually rotating the rotor.

The invention will be better understood by reference to the accompanying drawing in which.

Figure 1:
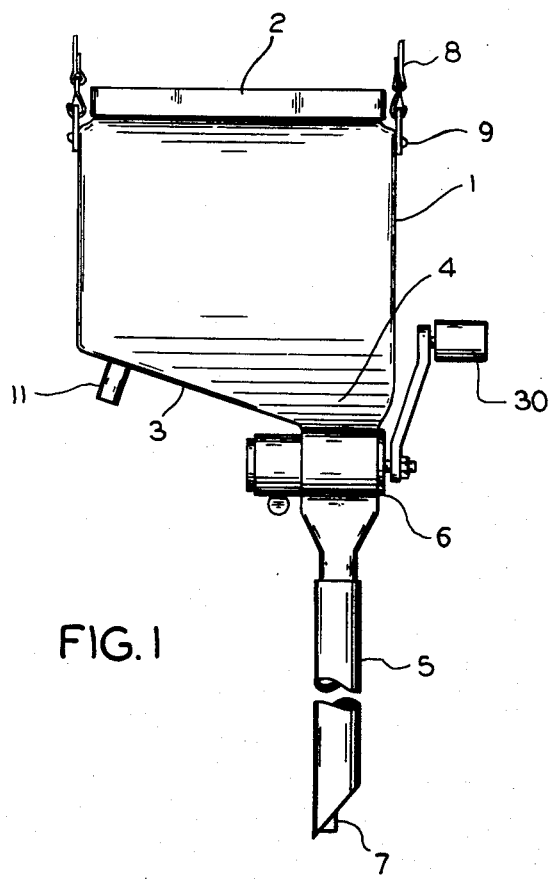
FIG. 1 is a front elevational view of one embodiment of an applicator device of the invention.
Figure 2:
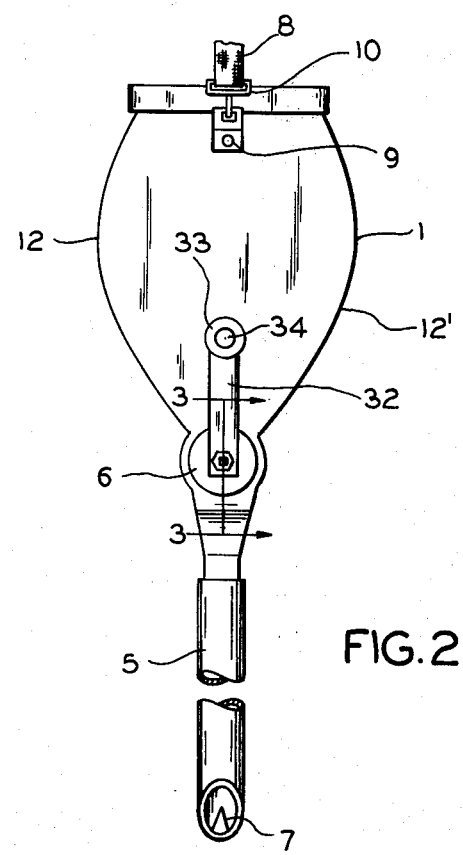
FIG. 2 is a side elevational view of the applicator of FIG. 1.

Referring to the drawings and particularly FIGS. 1 and 2, the applicator of the invention comprises a hopper 1, conveniently of a plastic such as polyethylene, for particulate material having a cover 2 and a floor 3 sloping downwardly to an offset opening 4 at a lower extremity of the hopper. An elongated discharge conduit shown generally at 5, extends downwardly from opening 4. The discharge conduit comprises an upper portion forming a funnel-shaped passage and a remaining portion of one or more tube-shaped members, telescoped together. The tube-shaped members are shown partly broken away in the drawing but will extend to whatever length is necessary to reach the nursery containers — typically several feet. A rotatable control means 6 is located in the upper portion of discharge conduit 5. A triangular deflector 7 is positioned at the exit end of the discharge conduit with its apex facing upward to scatter the descending particulate material. The applicator is intended to be both manually operated and manually carried and for this purpose, a carrying strap, partially shown at 8, is mounted on opposite side walls of the hopper, as by a bracket 9 and a hook 10. The carrying strap should be of sufficient length to encircle the shoulders of the operator. A handle 11 for holding and positioning the applicator is mounted on the underside of the hopper opposite control means 6. The exterior contour of the front and back walls 12 and 12' of the hopper are convex to allow the applicator to be rolled in and out by the operator to reach close or distant containers.

Figure 3:
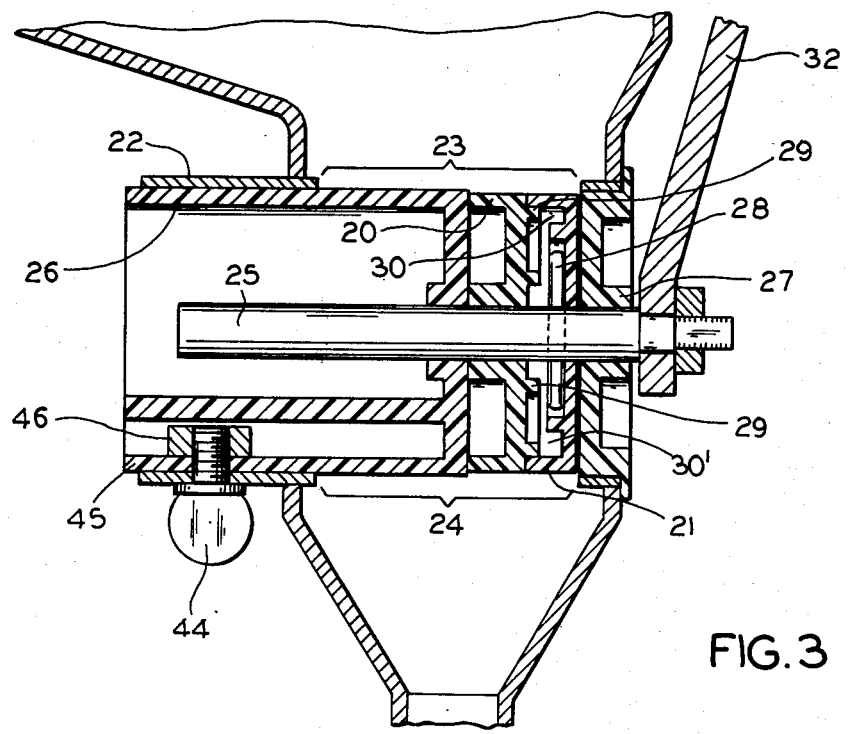
FIG. 3 is a cross-sectional view taken along the lines 3—3 of FIG. 2.

The rotatable control means illustrated in FIG. 3 contains two rotors 20 and 21, horizontally mounted for rotation within a cylindrical housing 22. The housing is preferably a metal such as stainless steel, whereas the rotors are preferably plastic, such as injection molded Delrin (a trademark for acetal resins) to resist wear and buildup. The housing has an opening 23 at the top thereof in communication with the hopper and a second opening 24 at the bottom in communication with the discharge conduit to permit particulate material to flow from the hopper through the rotor to the discharge conduit. Rotors 20 and 21 are mounted on a stainless steel shaft 25 journaled at both ends thereof on bearings 26 and 27 mounted within the cylindrical housing. Rotor 21 is fixed in place on the shaft by a locking pin 28 extending through a hole in shaft 25. Rotor 20 forms a snap-fit with rotor 21 by means of ribs 29 extending from rotor 20 into recessed portions 30 and 30' of rotor 21. Shaft 25 is rotated in either direction by a crank consisting of an arm 32 having a knob 33 rotatably attached to the extremity of the arm by a bolt 34. Shaft 25 is square in cross-section at the end on which arm 32 is mounted to keep the crank oriented with respect to the cavities in the rotors.

Figure 4:
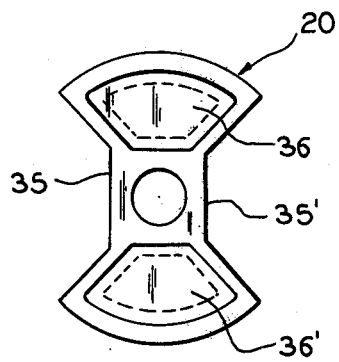
FIGS. 4 and 5 are front elevation views of the rotors shown in cross-section in FIG. 3.
Figure 5:
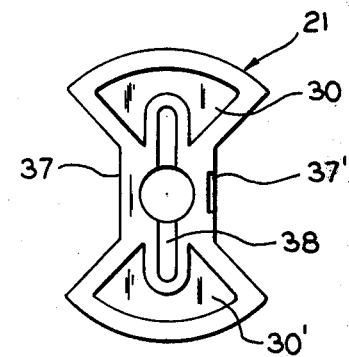

The two rotors 20 and 21 are shown more clearly in FIGS. 4 and 5. As there shown, the rotors are generally in the shape of a wheel having peripheral segments removed to form metering cavities on opposite radial portions of the rotor. Rotor 20 has cavities 35 and 35', each of which comprises a 90° segment of the rotor. Rotor 20 also has recessed portions 36 and 36' to form a snap fit with the ribs of an additional rotor, if used. Rotor 21 contains metering cavities 37 and 37' and an elongated recess 38 to receive pin 28 for locking the rotor to the shaft.

Figure 6:
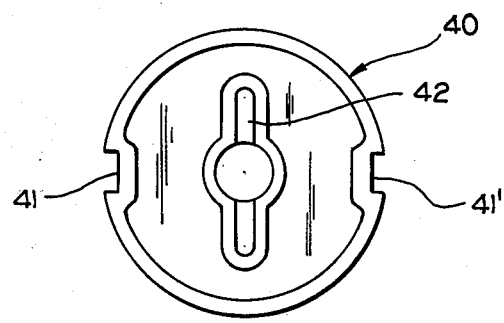
FIG. 6 is a front elevational view of a rotor of an additional type useful in the invention.
Figure 7:
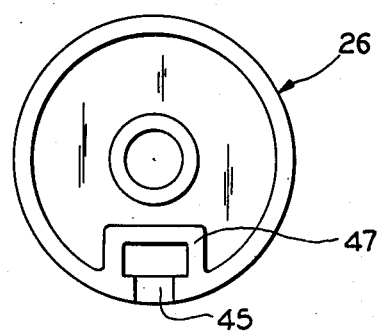
FIG. 7 is an end elevational view of the adjustable bearing shown in cross-section in FIG. 3.

FIG. 6 shows an alternate rotor design of a type useful for dispensing particulate material where lower application rates are desired. The rotor 40 shown in FIG. 6 would normally be used for applying herbicides to container-grown ornamentals, whereas rotors 20 and 21 would normally be used for applying fertilizers. Rotor 40 contains peripheral cavities 41 and 41' and on elongated recess 42 to receive a locking pin.

It should be noted that the diameter of the rotor is slightly less than the diameter of the bearings. The rotor is thus spaced from the housing by a small annular clearance to permit a small but controlled amount of particulate material to enter the clearance. The size of this clearance is typically about 0.025 to 0.035 inches for a cylinder of 2 inches diameter, but will vary with the type and particle size of particulate material. In the absence of this clearance, fines between the rotor and housing will build up and make a hard coating which will impede or stop rotation of the rotors. The clearance is of sufficient size to prevent such build-up but not so large as to upset the accuracy of the application rate.

Both bearings are desirably made of a plastic bearing material such as Nylatron GS, a trademark for a molybdenum disulfide filled nylon. In order to accommodate rotors of varying axial width or number, one of the bearings, bearing 26, is adjustable. Bearing 26 is essentially U-shaped in cross-section and of substantially greater axial width than bearing 27. Bearing 26 is slideably adjustable within cylindrical housing 22. A thumb screw 44 extends through an elongated axial slot 45 in the bearing and together with nut 46 locks the bearing in adjusted position. A reinforcement member 47 extends both axially and radially around nut 46 to hold the nut in place, prevent it from turning and give bearing 26 greater rigidity.

In operation, the applicator will normally be used by rotating the arm and rotor 180° to dispense a given amount of fertilizer or pesticide to a nursery container. The operator will then advance the applicator to the next container and repeat the process, dispensing an essentially identical quantity of particulate material. A rotation of 360° can, of course, be used for larger containers or higher rates. The rotors may be run either backward forward or in reciprocating fashion and the applicator will still dispense a precise amount of particulate material. The rate of application may be further controlled either by control of the size of the cavity in the rotor or by control of the number of rotors and their width.

What is claimed is:

1. A manually operated applicator adapted to distribute precisely controlled quantities of particulate material comprising in combination a hopper for said particulate material having an opening at a lower extremity thereof, an elongated discharge conduit extending below the hopper from said opening and control means located in the upper portion of said discharge conduit for controlling the amount of particulate material discharged from said applicator, said control means comprising a plurality of rotors horizontally mounted for rotation within a cylindrical housing, said housing surrounding said rotors and having openings therein in communication with said hopper and said discharge conduit to permit particulate material to flow from the hopper through the rotor to the discharge conduit, said rotors containing cavities therein for metering the amount of particulate material flowing therethrough, said rotors being spaced from the closed portion of said housing by a small annular clearance to permit a small but controlled amount of particulate material to enter said clearance, said rotors being fixedly mounted on a shaft journaled at both ends thereof on bearings mounted within said cylindrical housing, at least one of said bearings being axially adjustable to accommodate said rotors of varying axial width and an arm fixedly mounted on said shaft for manually rotating said rotors wherein one of said rotors is fixedly mounted on said shaft and another rotor is fixedly attached to said one rotor by a snap-fit.

2. The applicator of claim 1, in which said adjustable bearing is of substantially greater axial width than the other bearing.

3. The applicator of claim 2 in which the adjustable bearing contains an elongated slot therein for reception of a tightening means for adjustment of said bearing in said cylinder for said rotors.

4. The applicator of claim 1 in which the rotors are in the shape of a wheel having peripheral segments removed to form said metering cavities on opposite radial portions of the rotors.

5. The applicator of claim 1, in which the opening at the lower extremity of the hopper is offset to one side of the hopper and the floor of the hopper slopes downwardly toward said opening.

6. The applicator of claim 1, in which the upper portion of the discharge conduit forms a funnel-shaped passage and the remaining portion is one or more tube-shaped members.

7. The applicator of claim 1, in which the elongated discharge conduit contains at the exit end thereof a triangular deflector on its inner surface to scatter the particulate material.

8. The applicator of claim 1, in which the exterior contour of the front and back walls of the hopper is convex.

* * * * *